(12) United States Patent
Sun et al.

(10) Patent No.: US 11,724,617 B2
(45) Date of Patent: *Aug. 15, 2023

(54) METHODS AND SYSTEMS FOR FACILITATING CHARGING SESSIONS FOR ELECTRIC VEHICLES

(71) Applicant: NAD Grid Corp, Cupertino, CA (US)

(72) Inventors: Thomas Shaofeng Sun, Cupertino, CA (US); Timotej Gavrilovic, Cupertino, CA (US); Thai Vinh Loc Nguyen, Cupertino, CA (US)

(73) Assignee: NAD Grid Corp, Cupertino, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/171,400

(22) Filed: Feb. 9, 2021

(65) Prior Publication Data

US 2021/0213847 A1 Jul. 15, 2021

Related U.S. Application Data

(63) Continuation of application No. 16/843,874, filed on Apr. 8, 2020, now Pat. No. 10,953,765, which is a continuation-in-part of application No. 16/741,712, filed on Jan. 13, 2020, now Pat. No. 10,836,274.

(51) Int. Cl.
| | |
|---|---|
| *H02J 7/00* | (2006.01) |
| *H02J 7/14* | (2006.01) |
| *B60L 53/62* | (2019.01) |
| *B60L 53/30* | (2019.01) |
| *B60L 53/65* | (2019.01) |
| *B60L 53/63* | (2019.01) |
| *B60L 53/51* | (2019.01) |

(52) U.S. Cl.
CPC ............ *B60L 53/62* (2019.02); *B60L 53/305* (2019.02); *B60L 53/51* (2019.02); *B60L 53/63* (2019.02); *B60L 53/65* (2019.02)

(58) Field of Classification Search
CPC ........ B60L 53/62; B60L 53/51; B60L 53/305; B60L 53/63; B60L 53/65
USPC ......................................................... 320/109
See application file for complete search history.

(56) References Cited

U.S. PATENT DOCUMENTS

| | | |
|---|---|---|
| 10,814,741 B2 | 10/2020 | Homma et al. |
| 10,953,765 B1 * | 3/2021 | Sun .......................... B60L 53/62 |
| 2011/0246252 A1 | 10/2011 | Uesugi |
| 2013/0110296 A1 | 5/2013 | Khoo et al. |
| 2014/0184170 A1 | 7/2014 | Jeong |
| 2014/0336965 A1 | 11/2014 | Mori et al. |
| 2016/0159239 A1 | 6/2016 | Shi et al. |

(Continued)

*Primary Examiner* — Alexis B Pacheco
(74) *Attorney, Agent, or Firm* — Ivan J. Wong

(57) ABSTRACT

Embodiments of a method and/or system for charging one or more electric vehicles (e.g., based on one or more reserved charging sessions; for charging an electric vehicle during a scheduled time period; etc.) can include: receiving a reservation request (e.g., a reservation request including one or more reservation parameters; etc.); scheduling a reserved charging session based on the reservation request (e.g., based on reservation parameters from the reservation request; etc.); determining a check in at an Electric Vehicle Service Equipment (EVSE) for the reserved charging session; and/or causing the EVSE to charge the electric vehicle based on the reserved charging session (e.g., during the scheduled time period; etc.).

20 Claims, 9 Drawing Sheets

(56) References Cited

U.S. PATENT DOCUMENTS

| | | |
|---|---|---|
| 2017/0276503 A1 | 9/2017 | Oh et al. |
| 2019/0139107 A1 | 5/2019 | Khoo et al. |
| 2019/0139161 A1 | 5/2019 | Sakuma et al. |
| 2019/0143828 A1 | 5/2019 | Sawada et al. |
| 2019/0143833 A1 | 5/2019 | Shen et al. |
| 2019/0351775 A1 | 11/2019 | Jang et al. |
| 2019/0386502 A1 | 12/2019 | Penilla et al. |
| 2020/0055419 A1 | 2/2020 | Kim et al. |
| 2020/0070672 A1 | 3/2020 | Vahedi et al. |
| 2021/0213849 A1* | 7/2021 | Sun ................... B60L 53/67 |

* cited by examiner

METHODS AND SYSTEMS FOR FACILITATING CHARGING SESSIONS FOR ELECTRIC VEHICLES

CROSS-REFERENCE TO RELATED APPLICATIONS

This application is a continuation of U.S. patent application Ser. No. 16/843,874 filed on Apr. 8, 2020, which is a continuation-in-part of U.S. patent application Ser. No. 16/741,712, filed on Jan. 13, 2020 and now issued as U.S. Pat. No. 10,836,274 issued on Nov. 17, 2020, which are each incorporated in its entirety herein by this reference.

TECHNICAL FIELD

The disclosure generally relates to charging of electric vehicles.

DESCRIPTION OF THE EMBODIMENTS

The following description of the embodiments (e.g., including variations of embodiments, examples of embodiments, specific examples of embodiments, other suitable variants, etc.) is not intended to be limited to these embodiments, but rather to enable any person skilled in the art to make and use.

1. Overview

Figure 1:
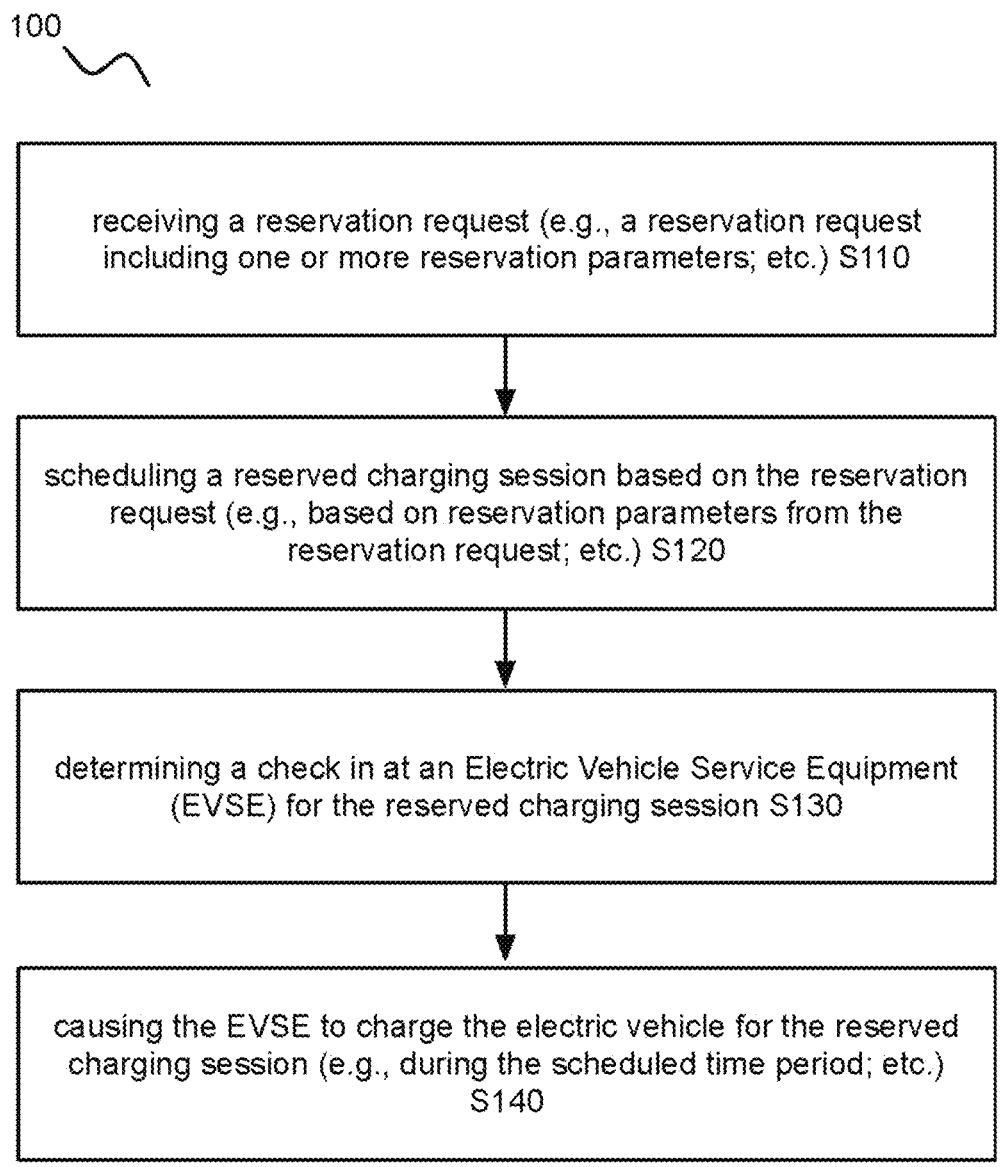
FIG. 1 includes a flowchart representation of variations of an embodiment of a method.
Figure 2:
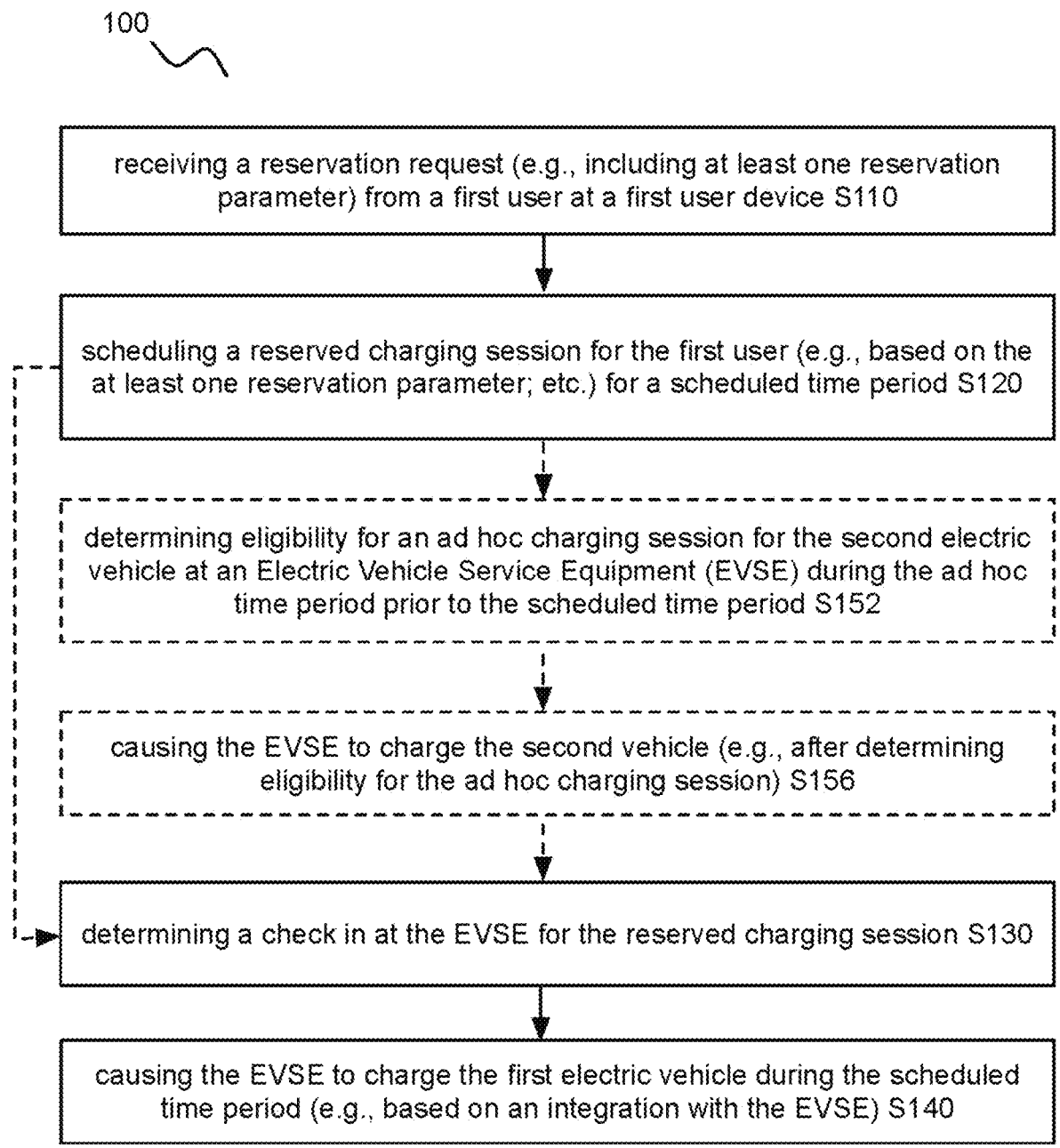
FIG. 2 includes a flowchart representation of variations of an embodiment of a method.
Figure 3:
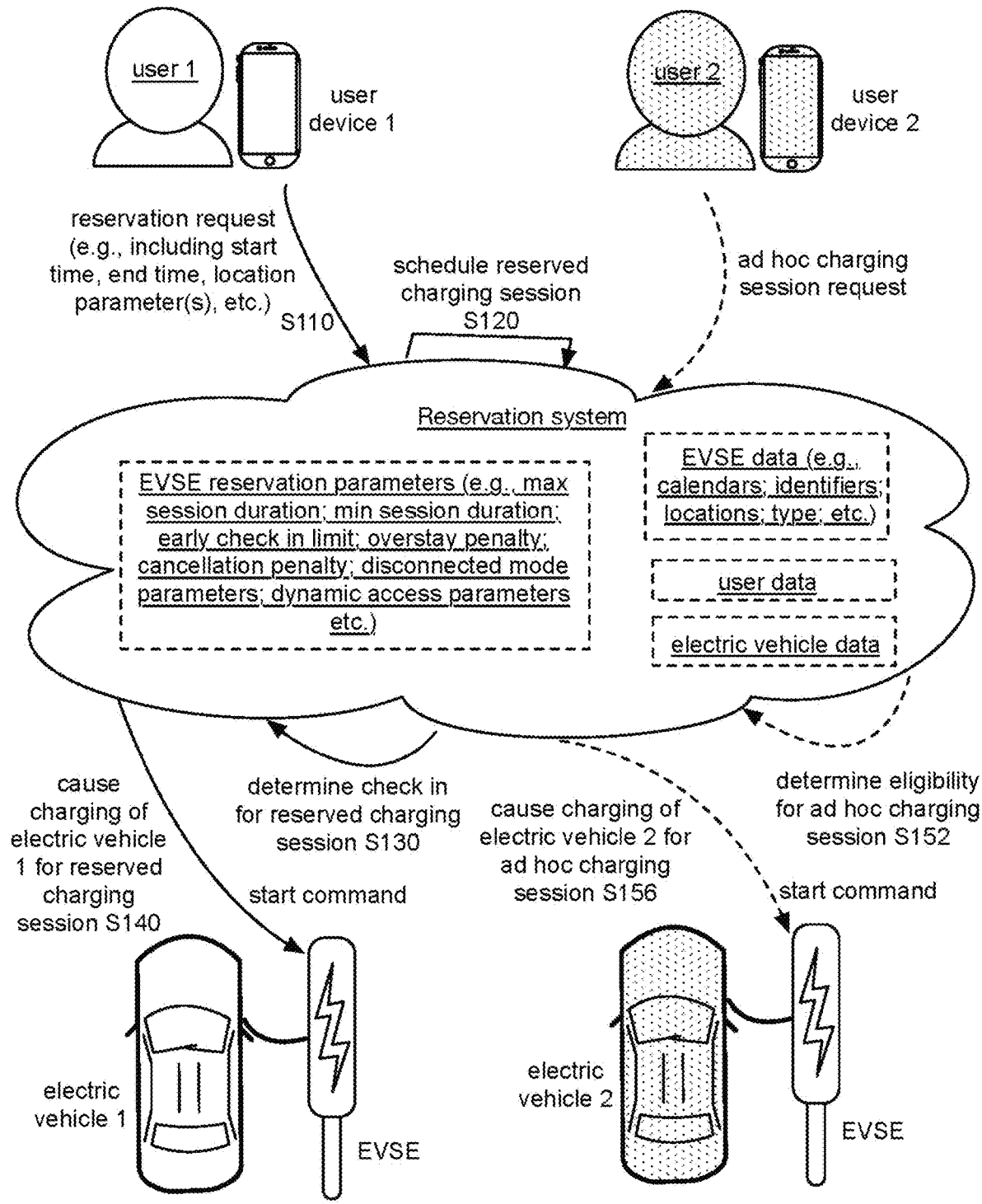
FIG. 3 includes a flowchart representation of variations of an embodiment of a method.

As shown in FIGS. 1-3, embodiments of a method 100 for charging one or more electric vehicles (e.g., based on one or more reserved charging sessions; for charging an electric vehicle during a scheduled time period; etc.) can include: receiving a reservation request (e.g., a reservation request including one or more reservation parameters; etc.) S110; scheduling a reserved charging session based on the reservation request (e.g., based on reservation parameters from the reservation request; etc.) S120; determining a check in at an Electric Vehicle Service Equipment (EVSE) for the reserved charging session S130; and/or causing the EVSE to charge the electric vehicle for the reserved charging session (e.g., during the scheduled time period; etc.) S140.

Additionally or alternatively, embodiments of a method 100 can include: facilitating an ad hoc charging session S150; providing a user interface S160; and/or providing notifications S170. However, embodiments of the method 100 can include any suitable processes for facilitating charging of one or more electric vehicles.

In a specific example, as shown in FIGS. 2-3, the method 100 (e.g., for charging a first electric vehicle during a scheduled time period and/or for charging a second electric vehicle during an ad hoc time period; etc.) can include: receiving a reservation request from a first user at a first user device (e.g., at a mobile application for the first user device; etc.), such as where the first user is associated with the first electric vehicle, and such as where the reservation request includes at least one reservation parameter indicative of the scheduled time period; scheduling a reserved charging session for the first user based on the at least one reservation parameter; determining eligibility for an ad hoc charging session for the second electric vehicle at an Electric Vehicle Service Equipment (EVSE) during the ad hoc time period prior to the scheduled time period (e.g., based on a comparison between the ad hoc time period and the scheduled time period; etc.); causing the EVSE to charge the second vehicle based on an integration with the EVSE (e.g., after determining eligibility for the ad hoc charging session; after determining that the user is eligible for the ad hoc charging session; etc.); determining a check in at the EVSE for the reserved charging session (e.g., after the ad hoc charging session for the second electric vehicle; etc.); and/or causing the EVSE to charge the first electric vehicle during the scheduled time period based on the integration with the EVSE (e.g., in response to determining the check in of the first electric vehicle at the EVSE, etc.).

Figure 4:
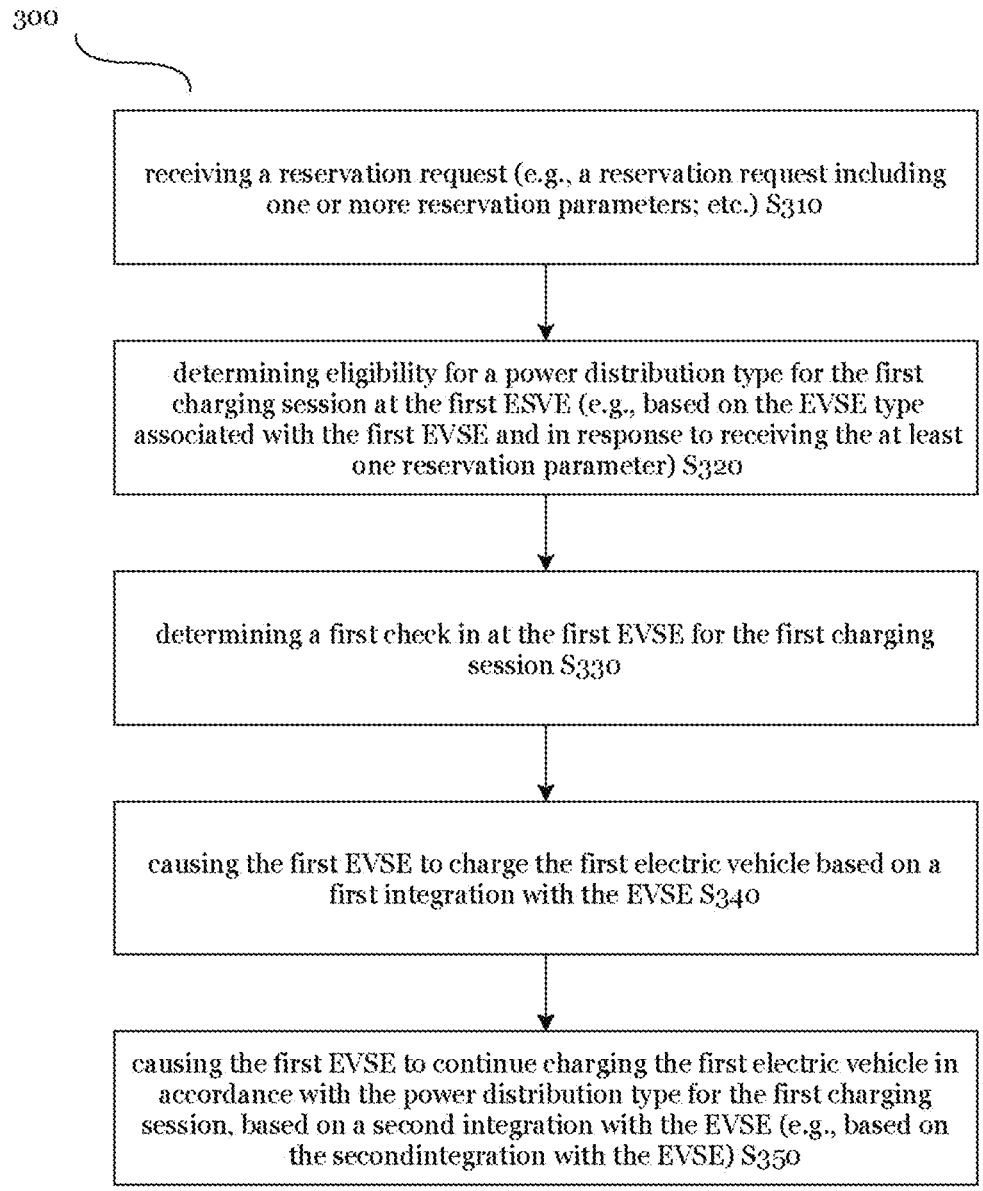
FIG. 4 includes a flowchart representation of variations of an embodiment of a method.
Figure 5:
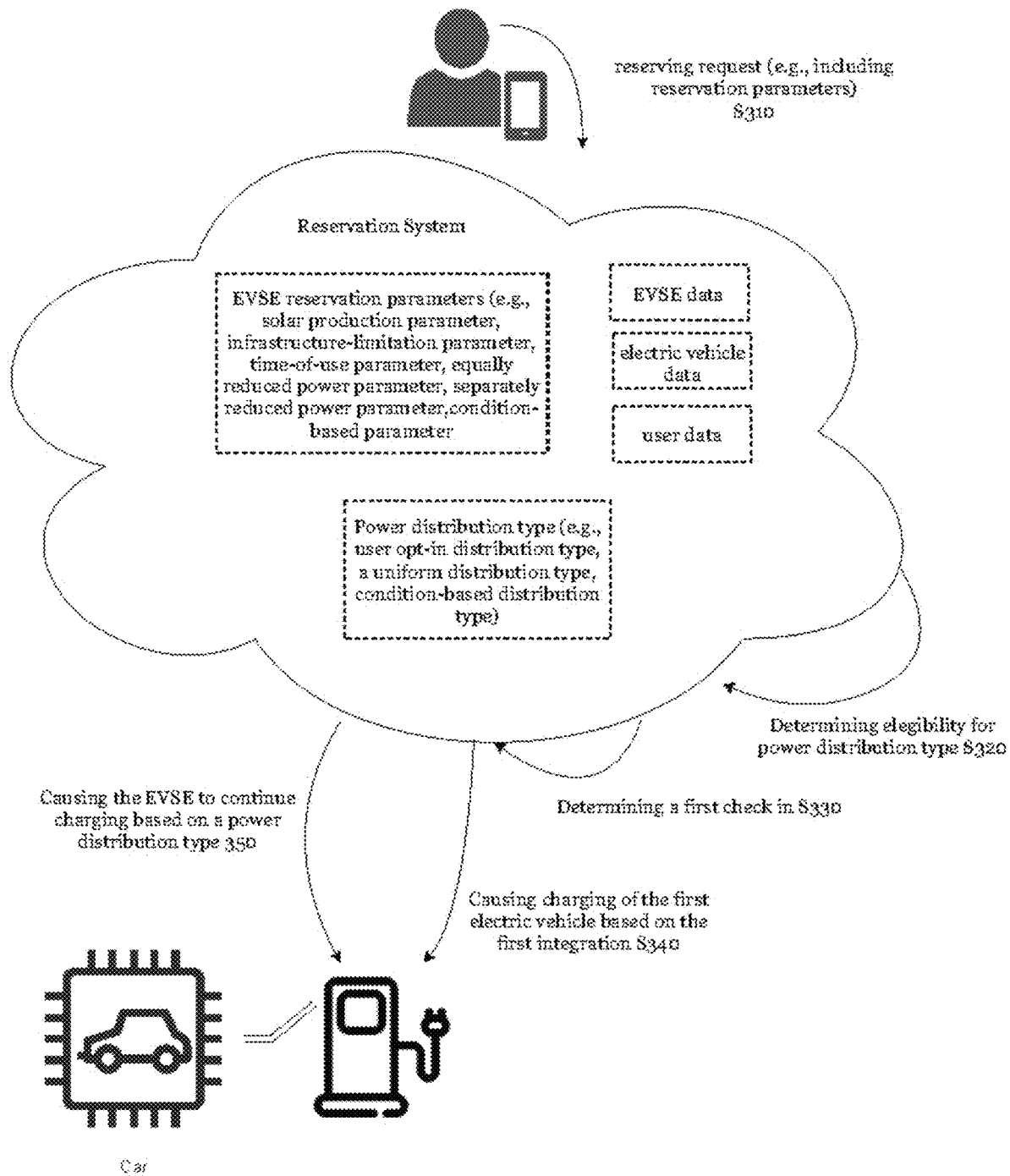
FIG. 5 includes a flowchart representation of variations of an embodiment of a method.

As shown in FIG. 4-5, embodiments of a method 300 (e.g., for charging an electric vehicle for a charging session, etc.) can include: receiving a reservation request from a first user at a first user device for a first charging session, wherein the first user is associated with the first electric vehicle, and wherein the reservation request comprises at least one reservation parameter indicative of the charging session for the first electric vehicle S310; determining eligibility for a power distribution type for the first charging session at the first ESVE (e.g., in response to receiving the at least one reservation parameter, etc.) S320; determining a first check in at the first EVSE for the first charging session S330; causing the first EVSE to charge the first electric vehicle based on a first integration with the EVSE S340; causing the first EVSE to continue charging the first electric vehicle in accordance with the power distribution type for the first charging session (e.g., after determining the first check in at the first EVSE for the first charging session, etc.), based on a second integration with the EVSE S350.

Figure 6:
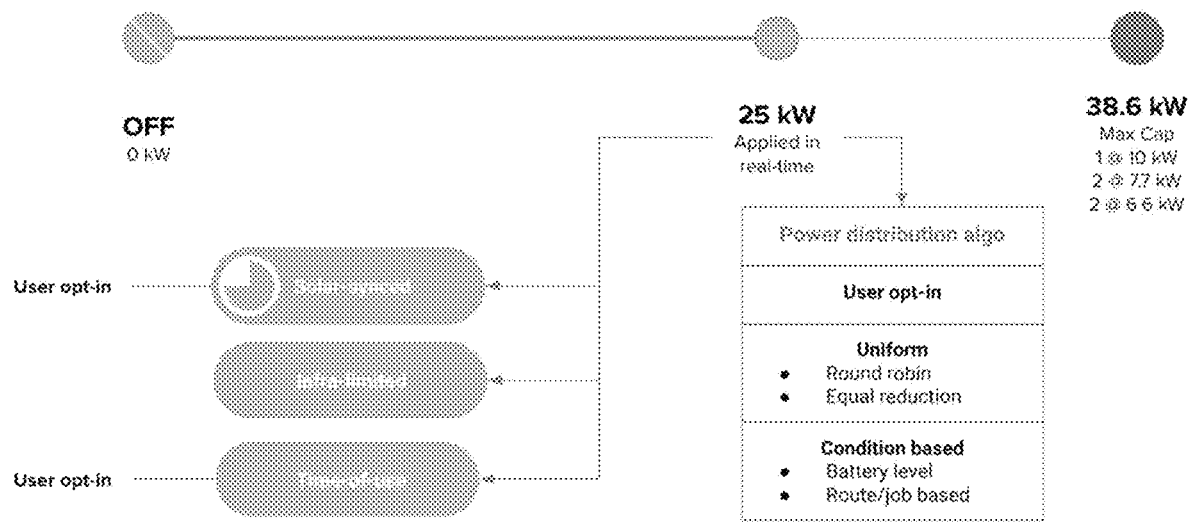
FIG. 6 includes a specific example of a flowchart representation of load management in variations of an embodiment of a method.

In a specific example, as shown in FIG. 6, the method 300 can include directly controlling load management for one or more EVSEs (e.g., via OCPP and/or other suitable protocols, such as protocols described herein, etc.), where controlling load management can include causing power throttling between 0 and the max capacity for each of the one or more EVSEs.

Figure 7:
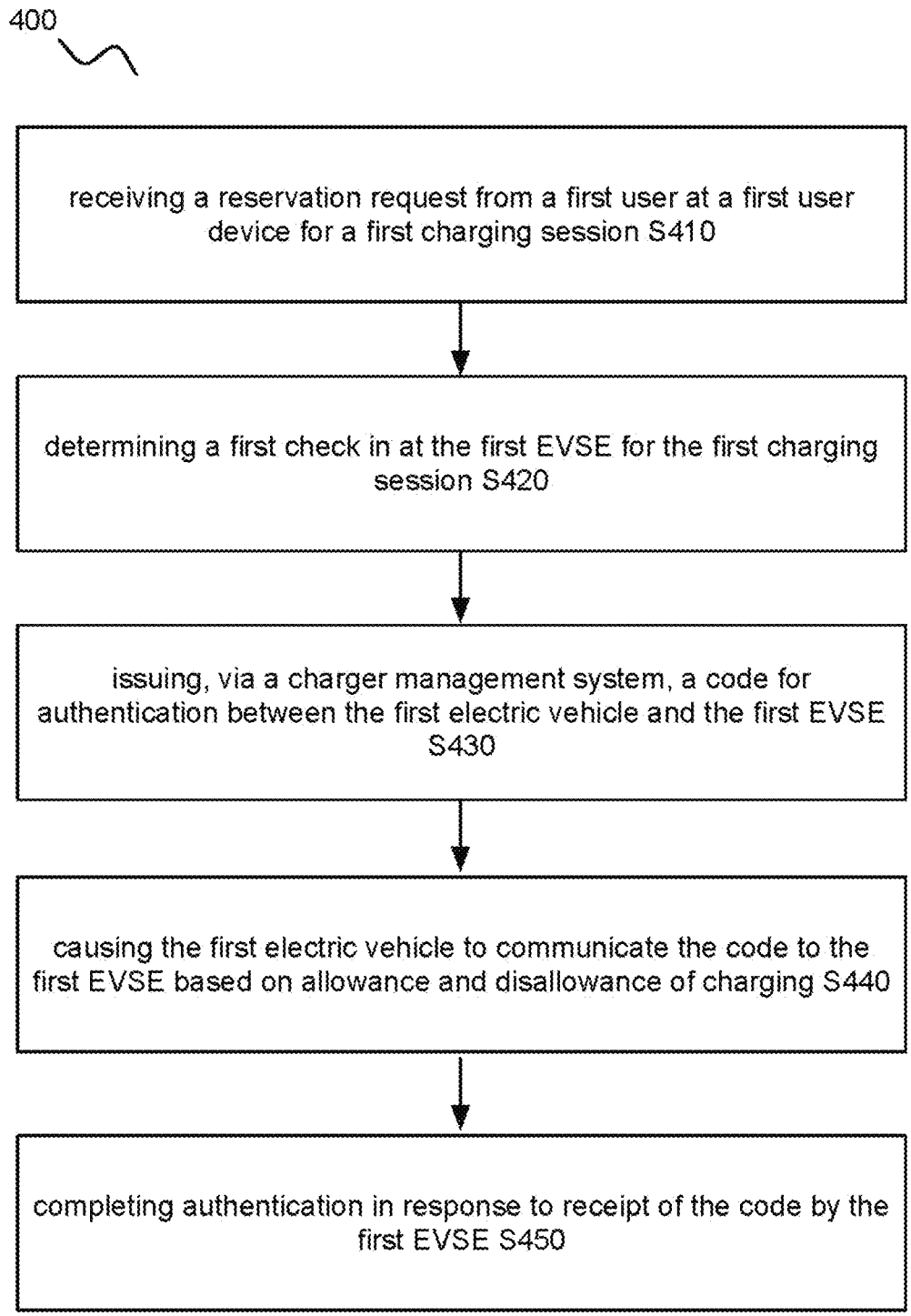
FIG. 7 includes a flowchart representation of variations of an embodiment of a method.

As shown in FIG. 7, embodiments of a method 400 (e.g., for charging a first electric vehicle at an EVSE), can include: receiving a reservation request from a first user at a first user device for a first charging session S410 (e.g., wherein the first user is associated with the first electric vehicle, and wherein the reservation request comprises at least one reservation parameter indicative of the first charging session for the first electric vehicle; etc.); determining a first check in at the first EVSE for the first charging session S420; issuing, via a charger management system, a code for authentication between the first electric vehicle and the first EVSE S430; causing the first electric vehicle to communicate the code to the first EVSE based on allowance and disallowance of charging S440; and/or completing authentication in response to receipt of the code by the first EVSE S450.

In a specific example, as shown in FIG. 1, the method 100 (e.g., for charging an electric vehicle for a reserved charging session, etc.) can include: receiving a reservation request including a reservation parameter indicative of a scheduled time period; scheduling the reserved charging session based on the reservation parameter; determining a check in of the electric vehicle at an EVSE for the reserved charging session; and causing the EVSE to charge the electric vehicle in association with the scheduled time period based on an integration with the EVSE (e.g., in response to determining the first check in of the electric vehicle at the EVSE, etc.).

Embodiments of the method 100 and/or the system 200 can function to enable any EVSE (e.g., any charging equipment) to handle ad hoc and/or reserved charging. Embodiments can function to improve user experience with charging electric vehicles by improving interoperability, reliability (e.g., where reservations can guarantee charging sessions at one or more EVSEs, etc.), and/or better utilization of public infrastructure. However, embodiments can include any suitable functionality.

In examples, the system and/or method can confer at least several improvements over conventional approaches. Specific examples of the method 100, 300 and/or system 200 can confer technologically-rooted solutions to issues associated with charging electric vehicles.

In specific examples, the method 100 and/or system 200 can improve low interoperability between different charging networks each requiring a different mode of access to receive charging (e.g., requiring an electric vehicle user to install and use multiple applications, RFID cards, etc.). In specific examples, the method 100, 300 and/or system 200 can improve low utilization of deployed EVSEs, such as where low utilization can be caused by gas cars parked at EVSEs, deployment of an EVSE at a low-traffic location, avoidance of public charging by users due to difficulty of access and/or unpredictable availability, and/or other suitable causes. In specific examples, the method 100, 300 and/or system 200 can improve unpredictability associated with a first come first serve model for using EVSEs, where such unpredictability can lead to long wait times or having to extensively search for an open EVSE.

In specific examples, the method 100, 300 and/or system 200 can improve various areas associated with electric vehicle charging, including one or more of: shared workplace charging, shared home charging in multi-unit dwellings, shared public place charging (e.g., for faster chargers with charging session limits; for lifestyle charging where charging sessions can be completed in a manner that complements a user's lifestyle and/or schedule; etc.); road trip planning; towing (e.g., for towing a stranded electric vehicle to an EVSE that can be reserved before arrival; etc.); fleets and/or ridesharing electric vehicles (e.g., delivery fleets, transport fleets, and/or ridesharing electric vehicles that can reserve one or more EVSEs; for avoiding downtime; etc.); V1G unidirectional charging (e.g., enabling users to reserve certain EVSEs during event hours to curtail load; reserving and/or throttling L2 EVSEs into L1 EVSEs during event hours to curtail load; etc.); Vehicle to Grid (V2G) charging (e.g., enabling bi-directional EVSEs that can supply electricity back to the grid to also service electric vehicles in normal conditions; enabling reservations for vehicles able to respond to demand response events via one or more bi-directional EVSEs; etc.); autonomous electric vehicles (e.g., which can be configured to make reservations for one or more scheduled charging sessions; which can be aided by human individuals who can plug in the EVSE for the autonomous electric vehicle; etc.); and/or any other suitable areas.

In specific examples, the technology can transform entities (e.g., EVSEs, electric vehicles; etc.) into different states or things. In specific examples, the method 100, 300 and/or system 200 can cause one or more EVSEs to charge one or more electric vehicles, such as for one or more reserved charging sessions and/or ad hoc charging sessions. In specific examples, the method 100, 300 and/or system 200 can facilitate the charging of an electric vehicle from a partially charged state or empty state to a fully charged or to a more fully charged state.

Additionally or alternatively, data described herein (e.g., reservation requests; reservation parameters, EVSE reservation parameters; EVSE identifiers; other EVSE data; user identifiers; vehicle identifiers; other identifiers; user interface data; user data; electric vehicle data; reserved charging session-related data; ad hoc charging session-related data; etc.) can be associated with any suitable temporal indicators (e.g., seconds, minutes, hours, days, weeks, time periods, time points, timestamps, etc.) including one or more: temporal indicators indicating when the data was collected, determined, transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores, confidence levels, identifiers, values along a spectrum, and/or any other suitable types of values. Any suitable types of data described herein can be used as inputs (e.g., for different models described herein, such as scheduling models for scheduling one or more reserved charging sessions and/or in relation to one or more ad hoc charging sessions; etc.), generated as outputs (e.g., of models), and/or manipulated in any suitable manner for any suitable components associated with the method 100, 300 and/or system 200.

One or more instances and/or portions of the method 100 and/or processes described herein can be performed asynchronously (e.g., sequentially), concurrently (e.g., performing scheduling for a plurality of reserved charging sessions and/or ad hoc charging sessions for a plurality of EVSEs across a plurality of locations, for a plurality of users and associated electric vehicles; performing processes of the method 100 concurrently on different threads for parallel computing to improve system processing ability for facilitating reserved charging sessions and/or ad hoc charging sessions; etc.), in temporal relation to a trigger event (e.g., performance of a portion of an embodiment of the method 100), and/or in any other suitable order at any suitable time and frequency by and/or using one or more instances of the system 200, components, and/or entities described herein.

Embodiments of the system 200 can include a reservation system (e.g., for scheduling and/or implementing one or more reserved charging sessions and/or ad hoc charging sessions; for maintaining reservation calendars for EVSEs; for communicating with one or more EVSEs to cause charging of one or more electric vehicles; a centralized reservation system; etc.); an application (e.g., a mobile application for a mobile user device; an application including a user interface, such as for receiving inputs from a user and/or for providing information to a user; etc.); and/or other suitable components. In variations, the system 200 can include one or more EVSEs, electric vehicles, and/or any other suitable components. Components of embodiments of the system 200 can include any suitable distribution of functionality across the components.

The system 200 and/or portions of the system 200 can entirely or partially be executed by, hosted on, communicate with, and/or otherwise include: a remote computing system (e.g., a server, at least one networked computing system, stateless, stateful; etc.), a local computing system, user devices, electric vehicles, EVSEs and/or other suitable charger equipment, mobile phone device, other mobile devices, personal computing device, tablet, wearable devices, databases, application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 200 can be physically and/or logically integrated in any manner (e.g., with any suitable distributions of functionality across the components, such as in relation to portions of the method 100; etc.). In specific examples, any suitable components of embodiments of the system 200 can perform any suitable portions of embodiments of the method 100 and/or 300. However, the method 100, 300 and/or system 200 can be configured in any suitable manner.

2.1 Receiving a Reservation Request.

Embodiments of the method 100 and/or 300 can include receiving a reservation request S110 and/or S310, which can function to receive information regarding a request for a reserved charging session (and/or ad hoc charging session; etc.).

Reservation requests are preferably digital requests received (e.g., wirelessly received; etc.) from a user at a user device. In a specific example, a reservation request can be received via a mobile application executing on a mobile user device of a user associated with an electric vehicle. In a variation, one or more reservation requests can be made at an EVSE (e.g., at a user interface of the EVSE; etc.). However, reservation requests can be made at any suitable location by any suitable devices and/or entities.

Reservation requests can be made from an entity remote from the EVSE(s) and/or charging location(s) that are requested. Additionally or alternatively, reservation requests can be made from an entity proximal (e.g., at; located near; close to; etc.) the EVSE(s) and/or charging location(s) that are requested, such as for an ad hoc charging session (e.g., a charging session for a current time at a proximal EVSE, etc.). However, reservation requests can be by entities at any suitable distance from EVSEs and/or charging locations.

Reservation requests can be manually made (e.g., by a user) and/or automatically made (e.g., by autonomous electric vehicles and/or non-autonomous electric vehicles, such as based on predefined rules; by any suitable computing devices; by a centralized reservation system; etc.). However, reservation requests can be made and/or received in any suitable manner.

Reservation requests are preferably received at a reservation system (e.g., a centralized reservation system; etc.), such as a reservation system that receives (and/or processes) reservation requests from a plurality of users for a plurality of EVSEs for charging a plurality of electric vehicles. Additionally or alternatively, reservation requests can be received at any suitable component (e.g., directly at an EVSE, etc.).

Reservation requests preferably include one or more reservation parameters indicating information (e.g., a scheduled time period for a charging session; location data; user data; etc.) regarding the requested charging session. Reservation parameters preferably include at least one of: reservation start time (e.g., start time for a charging session; etc.); reservation end time (e.g., end time for a charging session; etc.); and location (e.g., location of a user relative an EVSE and/or charging location; location coordinates of a user; such as based on location of a corresponding user device; such as based on GPS coordinates of a user device; etc.). Additionally or alternatively, reservation parameters can include any one or more of: destination data (e.g., requested destination for a charging location; etc.); origin data (e.g., current location data; etc.); EVSE data (e.g., data indicating a requested EVSE and/or associated information; data describing the EVSE, such as type of EVSE; a physical identifier; location of the EVSE; etc.); user data (e.g., user account information; location information; etc.); electric vehicle data (e.g., describing an electric vehicle to be charged in a reserved charging session; etc.); charging session data (e.g., requested charging features; etc.); location requests (e.g., indicating requested charging locations and/or EVSE(s); requested nearby institutions such as markets, restaurants, etc., nearby to the charging location; etc.); and/or any other suitable reservation parameters.

In a specific example, a reservation request can include a set of reservation parameters including a reservation start time for the reserved charging session; a reservation end time for the reserved charging session; and a location parameter indicating distance between a user (e.g., based on location of a user device; etc.) and a charging session location associated with the EVSE (e.g., a location of the EVSE; location coordinates for the EVSE; a general charging session location associated with a set of EVSEs including the EVSE; etc.).

In examples (e.g., specific examples concerning ad hoc charging sessions, etc.), a reservation request (e.g., from a user requesting an ad hoc charging session for an EVSE at a current time period, etc.) can include ad hoc reservation parameters including a reservation start time indicating a current time period (e.g., the current time at the time of the request; etc.), a reservation end time (e.g., end time for the ad hoc charging session, etc.), and/or a location parameter indicating a current location (e.g., of the user and/or user device at the time of request; such as based on current GPS location of the user device; etc.). In a specific example, a reservation request (e.g., for a reserved charging sessions; etc.) can include at least one reservation parameter including a first reservation start time for the reserved charging session, a first reservation end time for the reserved charging session, and a first location parameter (e.g., indicating distance between a first user and a charging session location associated with the EVSE; etc.); and where an ad hoc charging session can be associated with a set of ad hoc reservation parameters including a second reservation start time indicating a current time period, a second reservation end time for the ad hoc charging session, and a second location parameter indicating a current location of a second user associated with a second electric vehicle.

Figure 9:
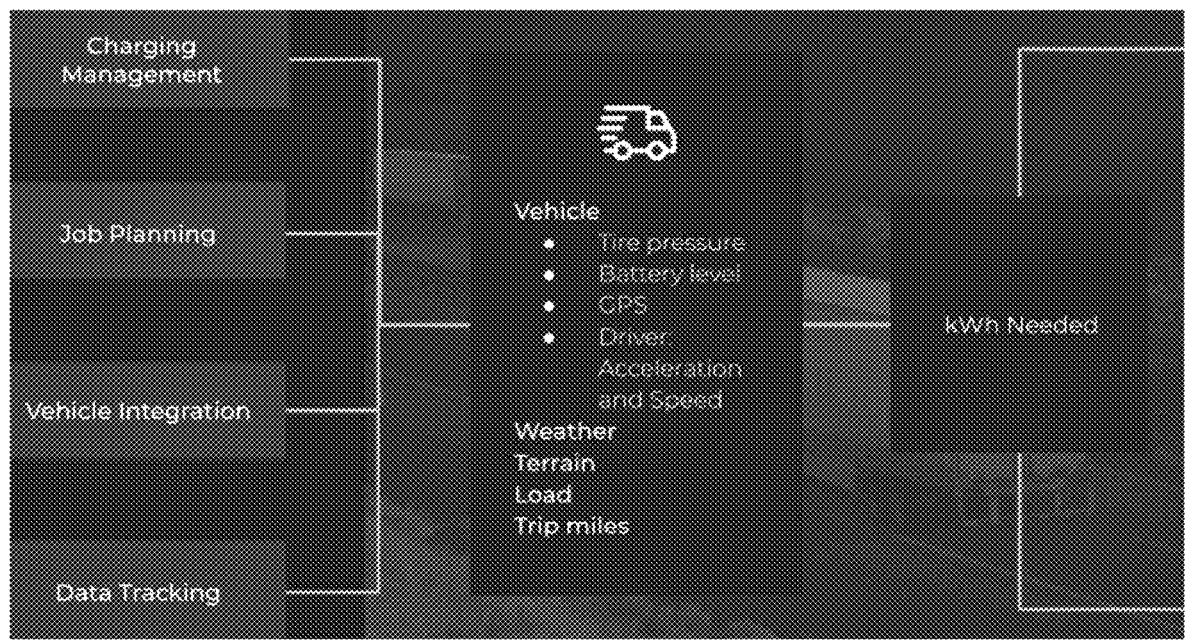
FIG. 9 includes a specific example of fleet management, such as where energy needed (e.g., in kWhs) can be predicted for any fleet job paired with a unique driver.

In examples (e.g. a specific example concerning charging sessions, etc.), a reservation request (e.g., from a user requesting a charging session for an EVSE, etc.) can include at least one power distribution parameters and/or other suitable reservation parameters indicative of how the EVSE implements charging of the electric vehicle. In examples, power distribution parameters can be implemented independent of parameters included in a reservation request (e.g., determining an optimal charging method to enable smooth fleet operations; etc.). Power distribution parameters can include one or more of a solar production parameter (based on the solar production by the EVSE during the charging session or at a period of time, etc.); an infrastructure-limitation parameter (e.g., obtained from data describing the EVSE, such as type of EVSE and location of the EVSE, etc.); a time-of-use parameter (e.g., for V1G unidirectional charging enabling users to reserve certain EVSEs during event hours to curtail load, etc.); an equally reduced power parameter (e.g., indicating permission to throttle L2 EVSEs into L1 EVSEs to curtail equally among a set of EVSE, etc.); a separately reduced power parameter (e.g., throttling L2 EVSEs into L1 EVSEs individually and separately from the set of EVSEs); and a condition-based parameter associated to a set of data that can inform battery level needed based on battery level condition of an expected route or job (e.g., using telematics data, such as vehicle data, including battery level, destination data for a plan route, origin data to indicate current location, and any other suitable data, etc.). In an example, a condition-based parameter can include charging to meet a required battery level for a job or route. The battery level needed (e.g., to complete the next job and/or route and come back to the base location) can be based on one or more of the total travel distance (e.g., collected from driver and/or job management system, etc.); the weather condition (via online weather sources, etc.); terrain (via third party data, online sources, etc.); load weight (obtained from user or job management system, etc.); and/or driver driving efficiency (e.g., calculated from real time battery data and distance travelled). In a specific example, implementing a condition-based power distribution type can include intelligently distributing power by determining the battery level needed based on the difference between current battery level and the needed battery level for the next job or route. In a specific example, as shown in FIG. 9, fleet management can include predicting energy (e.g., in kWhs) for one or more fleet jobs (e.g., predicting energy needed for a fleet job paired with a unique driver, etc.).

However, reservation parameters (e.g., reservation parameters for reserved charging sessions; ad hoc reservation parameters; etc.) can be configured in any suitable manner.

A reservation request is preferably received after (e.g., in response to; at a time after; etc.) a submission of the reservation request by an entity (e.g., by a user at a user device; etc.), but reservation requests can additionally or alternatively be received at any suitable time relative portions of embodiments of the method 100, and/or at any suitable time. In a specific example, a reservation request is received directly following a submission of a reservation request by a user at a mobile application for a user device. In a specific example, for a reservation request submitted directly at an EVSE operating in a disconnected mode (e.g., without connectivity to a centralized reservation system; without connectivity to a calendar for reservations at the EVSE; etc.), the reservation request can be received at centralized reservation system after the EVSE is able to re-connect.

However, receiving a reservation request S110 and/or S310 can be performed in any suitable manner.

2.2 Scheduling a Reserved Charging Session.

Embodiments of the method 100 can include scheduling one or more reserved charging sessions S120, which can function to reserve one or more charging sessions at one or more EVSEs and/or charging locations for one or more electric vehicles.

Charging sessions (e.g., a session for charging an electric vehicle; etc.) can include a reserved charging session, an ad hoc charging session (e.g., a charging session requested and/or implemented for a current, ad hoc time period; etc.), and/or other suitable types of charging sessions. A reserved charging session preferably includes a charging session that is reserved and scheduled ahead of the time period of charging. A reserved charging session is preferably associated with a scheduled time period during which charging of the electric vehicle occurs.

Scheduling one or more reserved charging sessions is preferably based on one or more reservation requests. Scheduling one or more reserved charging sessions can include processing one or more reservation parameters from one or more reservation requests, such as in order to schedule a reserved charging session according to the one or more reservation parameters. In an example, scheduling one or more reserved charging sessions can include scheduling a reserved charging session for a scheduled time period and an EVSE (and/or charging location) indicated by the set of reservation parameters from a received reservation request.

In a specific example, a reservation request can include a geographical destination parameter (e.g., coordinates and/or a destination selected by a user and/or other suitable entity; etc.), where scheduling a reserved charging session can include determining a reserved charging session location (e.g., associated with an EVSE to be used for the charging session; etc.) based on the geographical destination parameter (e.g., where the reserved charging session location can be proximal and/or at the same location of the geographical destination; etc.) and/or scheduling the reserved charging session for the reserved charging session location. A reserved charging session location can include the location of a single EVSE (e.g., where the user is directed to use the single EVSE for the reserved charging session; etc.), the general location of a plurality of EVSEs (e.g., where the user can select an EVSE to use from the plurality of EVSEs; etc.), and/or any suitable locations associated with the reserved charging session. In specific examples, determining a reserved charging session location can be based on distance between the reserved charging session and the geographical destination indicated by the geographical destination parameter; availability of one or more EVSEs at the reserved charging session location and/or at other suitable charging session locations (e.g., other proximal charging session locations; etc.); user data (e.g., user eligibility for a charging session at the reserved charging session location and/or other suitable charging session location; etc.); electric vehicle data; EVSE reservation parameters; other reservation parameters from a reservation request; and/or any other suitable data. However, scheduling one or more reserved charging sessions based on one or more reservation requests can be performed in any suitable manner.

Alternatively, scheduling one or more reserved charging sessions can be performed independent of a reservation request, such as where a reserved charging session is automatically scheduled (e.g., based on a set of predefined rules; by a centralized reservation system; etc.). In a specific example, recurring reserved charging sessions can be automatically scheduled based on one or more parameters for a recurring reservation (e.g., where parameters can indicate time interval for recurring reservations, such as daily, weekly, etc.; any suitable reservation parameters; etc.).

Scheduling one or more reserved charging sessions is preferably based on and/or associated with one or more EVSE reservation parameters. An EVSE (and/or set of EVSEs; and/or a charging location; etc.) is preferably associated with a set of EVSE reservation parameters for implementing one or more reserved charging sessions and/or ad hoc charging sessions. EVSE reservation parameters can include any one or more of: maximum session duration parameters (e.g., indicating a maximum charging session duration; etc.); minimum session duration parameters (e.g., indicating a minimum charging session duration; etc.); early check in limit parameters (e.g., indicating guidelines for when a user checks in early relative to a reservation start time for a reserved charging session; etc.); overstay penalty parameters (e.g., indicating guidelines for when a user overstays after a reservation end time for a reserved charging session; such as requiring payment of $1 per minute stayed after the reservation end time and/or requiring payment of any suitable amount; etc.); cancellation penalty parameters (e.g., indicating guidelines for when a reserved charging session is cancelled; such as charging a monetary penalty for cancelling a reserved charging session within a threshold time period before the reservation start time; etc.); disconnected mode parameters (e.g., indicating guidelines for operation in a disconnected mode in response to connectivity issues with an EVSE, such as connectivity issues between an EVSE and a corresponding cloud-based calendar for scheduling reserved charging sessions; etc.); reservation grace period parameters (e.g., indicating guidelines for when a user has not checked in and the time is after the reservation start time; indicating a hold time where a reservation is cancelled if a user has not checked in within the hold time after reservation start time; etc.); dynamic access parameters; and/or any other suitable parameters.

In a specific example, an EVSE is associated with a set of EVSE reservation parameters for implementing the reserved charging session, where the set of EVSE reservation parameters includes: a maximum session duration, a minimum session duration, an early check in limit, an overstay penalty, and a cancellation penalty.

In a specific example, a first EVSE is associated with a first set of EVSE reservation parameters for implementing a first reserved charging session, and where the first set of EVSE reservation parameters includes: a first maximum session duration, a first minimum session duration, and a first early check in limit (e.g., where causing the EVSE to charge the electric vehicle includes causing the EVSE to charge the electric vehicle in accordance with the first set of EVSE reservation parameters and/or in association with the scheduled time period; etc.). In the specific example and/or other specific examples, the method 100 can include receiving a second reservation request; scheduling a second reserved charging session based on the second reservation request, where a second EVSE is associated with a second set of EVSE reservation parameters including a second maximum session duration distinct from the first maximum session duration, a second minimum session duration distinct from the first minimum session duration, and a second early check in limit distinct from the first early check in limit; determining a second check in (e.g., of the second electric vehicle; etc.) at the second EVSE for the second reserved charging session; and/or causing the second EVSE to charge the electric vehicle (e.g., in response to determining the second check at the second EVSE for the section reserved charging session; etc.) in accordance with the second set of EVSE reservation parameters, such as based on a second integration with the second EVSE.

In examples, the minimum session duration parameter can be used in determining whether or not to allow an ad hoc charging session or reserved charging session when there is an already-scheduled, upcoming reserved charging session. In a specific example, an EVSE can be associated with a minimum session duration parameter indicating a minimum charging session duration for a charging session at the first EVSE, where the method 100 can include determining eligibility for an ad hoc charging session at the first EVSE during an ad hoc time period prior to the scheduled time period, such as based on a comparison between the minimum charging session duration and a time difference between the ad hoc time period and the scheduled time period. In a specific example, a reserved charging session and/or ad hoc charging session can be allowed if the time until an already-scheduled, upcoming reserved charging session is greater than (or equal to) the minimum session duration indicated by the minimum session duration parameter. In an example, the minimum session duration parameter can additionally or alternatively be used in creating reservation slots, such as for use in a user interface for allowing users to select reservation slots based on availability. However, the minimum session duration parameter can be configured in any suitable manner and can be used in any suitable manner for determining eligibility for an ad hoc charging session.

In examples, the early check in limit parameter can be used in determining whether a user (e.g., a user who has checked in prior to their reserved charging session start time; etc.) is able to start a charging session (e.g., an ad hoc charging session; a shifted reserved charging session; etc.) before their reserved charging session. In a specific example, an EVSE can be associated with an early check in limit parameter indicating a reservation modification to be performed based on a time difference between a reservation check in time and a reservation start time for a future reserved charging session. In examples, the reservation modification can include at least one of cancellation of the future reserved charging session and shifting of the reservation start time for the future reserved charging session reserved charging session. In specific examples, the reservation modification can be performed based on (e.g., in response to; etc.) the time difference (e.g., between a reservation check in time and a reservation start time; etc.) exceeding the scheduled duration of the reserved charging session, but can additionally or alternatively be based on any suitable comparison of the time difference to any suitable time period; and/or based on any suitable time thresholds. However, the early check in parameter can be configured in any suitable manner.

One or more EVSEs can be associated with dynamic access parameters specifying who can access the one or more EVSEs (e.g., which access groups can access the EVSEs; etc.), when the one or more EVSEs can be accessed by users eligible to access the one or more EVSEs, how the one or more EVSEs can be accessed (e.g., different pricing for different users; etc.), and/or other suitable access-related aspects. Dynamic access parameters can specify one or more access groups indicating the user(s) (e.g., categories of users; etc.) that can access a given EVSE. Different access groups can be associated with different pricing (e.g., a user will be able to access pricing specific to the access group that the user belongs to; etc.). In a specific example, a fleet site charging location (e.g., including a plurality of EVSEs, etc.) can be associated with dynamic access parameters specifying access restriction on the EVSEs during business hours, where only the fleet and employee access groups can access the EVSEs. In a specific example, the fleet access group can access the EVSEs at no cost (e.g., free charging), the employee access group can access the EVSEs at a charging pricing of $1/hr, where the EVSEs are open to the general public (e.g., not restricted to fleet and employee access groups; etc.) during non-business hours, and where the general public can access the EVSEs at a charging pricing of $3/hr. However, any suitable access groups can be specified for accessing any suitable EVSEs at any suitable time periods and at any suitable pricing.

In variations, access groups can be associated with one or more access codes. In a specific example, the access code allows the specific access capabilities corresponding to the access group (e.g., ability to charge, specific pricing, specific EVSE reservation parameters such as maximum session duration, etc.). Different access groups can be associated with different access codes. Access codes can be unique to access groups; additionally or alternatively, same access codes can provide access to different access groups. In response to users attempting to access a restricted EVSE and/or restricted charging location (e.g., associated with dynamic access parameters; etc.), a user profile can be analyzed (e.g., using a mobile application, other applications, etc.) for one or more relevant access codes that will provide the user with access. If a user profile does not include a relevant access code (and/or in any suitable scenarios), a user can be prompted (e.g., via the mobile application, other applications, the EVSE, etc.) to input the access code to gain access. In a specific example, a user only needs to enter the relevant access code once per charging location to gain and retain access.

In variations, morse code communication (e.g., a morse code handshake) between one or more electric vehicles and one or more EVSEs can be implemented (e.g., based on ISO 15118 standard and/or any other suitable standards and/or protocols, etc.). In examples, a morse code can be communicated from an electric vehicle to an EVSE for authentication allowing plug-in and charge. In examples, an access code can be communicated to the EVSE by the electric vehicle.

A charger management system (e.g., that controls the electric vehicle and EVSE in a charging session) can issue a random 0 and 1 pattern as the access code (e.g., authentication code, etc.) for an electric vehicle (e.g., via the mobile application, other applications, the EVSE, etc.), such as where the access code is required to be communicated by the electric vehicle to the EVSE to complete authentication. In specific examples, an electric vehicle can communicate a 1 by activating its built-in charger, thus allowing charging, and communicate a 0 by deactivating its built-in charger, or vice versa (e.g., via electric vehicle or vehicles capable of programmable start/stop charging, etc.). In a specific example, upon arrival for a charging session, the electric vehicle executes the 0 and 1 pattern by turning on and off its built-in charger (via programmable start/stop charging, etc.). The charger management system can detect the sequential activation and deactivation of the electric vehicle's built-in charger (e.g., by detecting charging of the electric vehicle when charging is allowed, and vice versa, etc.), where authentication can be completed upon detection of the correct code. Optionally, other characters may be communicated using 0's and 1's via Morse code. A new code of 0's and 1's can be generated for every charging session for improved security.

In a specific example, determining a check in can include generating, by a charger management system, a code (e.g., access codes, authentication codes, etc.), wherein the code includes a data sequence uniquely identifying the electric vehicle; causing the electric vehicle to communicate the code to the EVSE upon plugin of an EVSE into an electric vehicle; and wherein the check in is successful upon receiving, by the EVSE, the code as generated.

In specific examples, different 0 and 1 patterns can be generated for different charging session scenarios in order to improve security. In a specific example, a "00110" code can be issued for an electric vehicle, where the code is required to be communicated by the electric vehicle to the EVSE to complete authentication, and where each "1" in the code is communicated by the electric vehicle by activating its built-in charger, and where each "0" in the code is communicated by the electric vehicle by deactivating its built-in charger.

In a specific example, a charger management system can allow charging for 5 minutes (and/or any suitable amount of time, such as based on the charging session parameters and associated data), where the electric vehicle is expected to communicate the issued Morse code to the EVSE, and where charging will stop after 5 minutes (and/or any suitable amount of time) if the correct code is not communicated.

Figure 8:
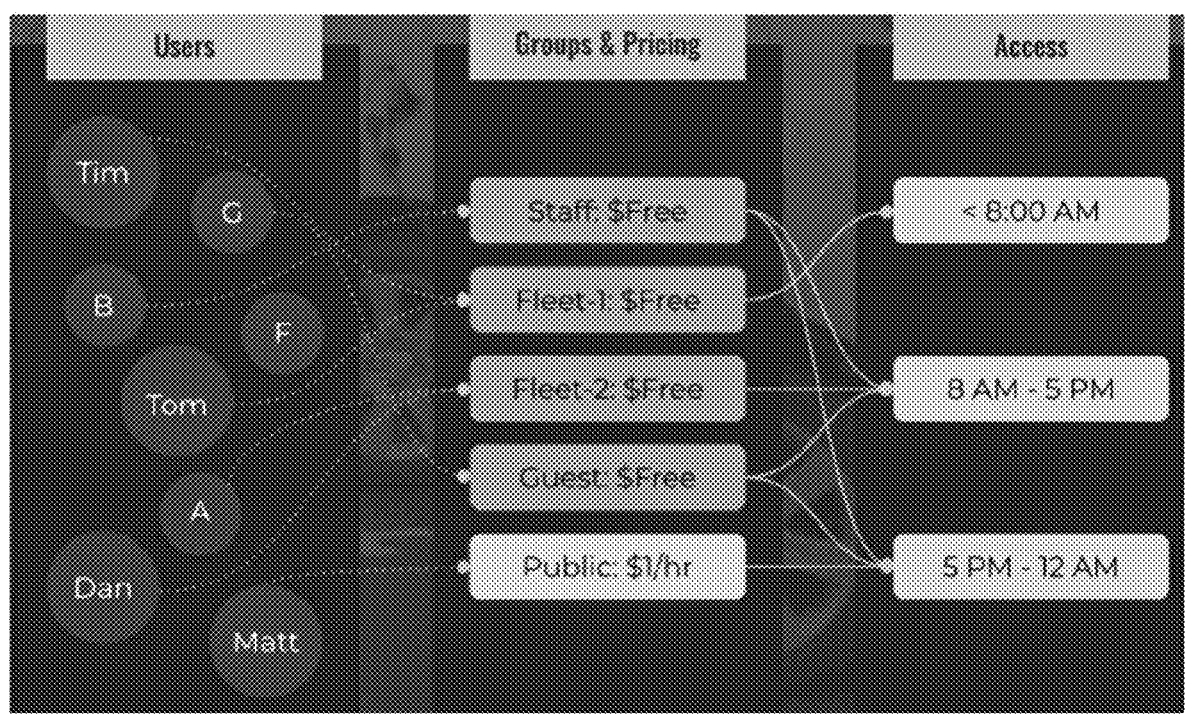
FIG. 8 includes a specific example of a flowchart representation of variations of an embodiment of a method.

In a specific example, as shown by FIG. 8, users can be grouped into different access groups (e.g. user groups; groups such as staff, faculty, fleet, student, public, and/or other suitable groups, such as a group associated with a set of electric vehicles) for dynamic access control. Codes (e.g., data sequence uniquely identifying an access group, access codes, authentication codes, etc.) can be generated for different user groups where such codes can be shared across the set of vehicles. The codes can be refreshed (e.g., on a periodic interval, such as daily, etc.). The codes can then be associated with an access parameter placed on a user group. The access parameter can include a pricing parameter specifying a pricing category (e.g., no charge, employee/fleet rate, student rate, public rate, etc.) for the access group, and/or a dedicated time slot parameter assigning dedicated charging access to different time slots. However, user groups can be configured in any suitable manner.

In variations, users can gain access to a particular access group through a request process, such as where users can request access to an access group, and an admin (e.g., host, etc.) can grant access to the access group. In specific examples, an admin sets access restricted time ranges, and for each access restricted time range, the admin can add one or more access groups to the time range, indicating the users in these access group(s) that are allowed to access the EVSE(s) (e.g., via ad hoc charging sessions and/or reserved charging sessions, etc.).

Access groups can be associated with one or more access codes and/or one or more whitelists. Additionally or alternatively, access groups can be associated with one or more blacklists (e.g., indicating users, access groups, and/or other entities who are restricted from charging). However, access groups and dynamic access parameters can be configured in any suitable manner.

In examples, cancellation of one or more reserved charging sessions can be performed by one or more of: a residential host, a site host (e.g., manager; etc.), a user (e.g., associated with the electric vehicle; etc.) and/or any other suitable entities.

EVSEs can include any suitable types of EVSEs. Types of EVSEs can differ based on appearance; access method (e.g., RFID; network account via application such as mobile application; credit card module; plugin without authentication; etc.); charging speed (e.g., level 1/L1, which can generally be residential or commercial, and/or can include a regular wall outlet such as one providing 120V, AC, adding around 5 miles/hour of charging for plugin hybrids; level 2/L2, which can generally be residential or commercial, and/or can provide 220V-240V, AC, power varying from 6.6 kW to 20 kW, adding around 20 miles or more/hour of charging; level 3/L3, which can generally be commercial or public, and/or can be DC, power of 25 kW or above; etc.); corresponding network operator; corresponding hardware original equipment manufacturer (OEM); and/or other suitable features.

Different types of EVSEs can include and/or be associated with same or different types of EVSE reservation parameters, and/or same or different values for types of EVSE reservation parameters. For example, EVSEs with higher power (e.g., 25 kW and above; etc.) can be associated with shorter maximum session duration parameters compared to EVSEs with lower power. In a specific example, a L3 EVSE can be associated with a maximum session duration of 45 minutes or less. In a specific example, a L2 EVSE can be associated with a maximum session duration from 2 hours to 4 hours. In examples, shorter maximum session durations can encourage higher turnover, but maximum session durations that are too short can lead to poor user experiences. However, any suitable EVSEs can include and/or be associated with any suitable EVSE reservation parameters.

Embodiments of a method 100 can include infrastructure management, which can include monitoring, collecting, and/or otherwise processing data from one or more EVSEs and/or other suitable hardware. However, infrastructure management can be performed in any suitable manner.

Embodiments of a method 100 can include community management (e.g., user management). Community management can include setting EVSE reservation parameters (e.g., rules, etc.) regarding how one or more EVSEs can be used. Community management admins (e.g., hosts, etc.) preferably set EVSE reservation parameters for the one or more managed EVSEs, but any suitable entities can be given access to set EVSE reservation parameters. In specific examples, EVSE reservation parameters including one or more of maximum session duration, how many chargers are reservable, overstay penalty, and/or other suitable EVSE reservation parameters can be set for one or more EVSEs. Communities (e.g., that can be managed) can include one or more charging locations and/or one or more EVSEs. Different communities can be associated with different types of hardware (e.g., different types of EVSEs; different EVSE types with different charging speeds; EVSEs synced with solar production; etc.), different user groups (e.g., fleet, employees, contractors; different access groups; etc.), where such differences can correspond to different EVSE reservation parameters. In a specific example, in communities with very cold or hot weather where battery performance drops, a longer maximum session duration can be established. In a specific example, in a community location with high traffic where a community management admin desires a higher turnover, a shorter maximum session duration can be established. However, community management can be performed in any suitable manner.

Scheduling one or more reserved charging sessions is preferably performed with a reservation system (e.g., a centralized reservation system; etc.), but can additionally or alternatively be performed by any suitable components (e.g., by an EVSE for scheduling a charging session at that EVSE, such as based on a reservation request submitted directly at the EVSE; etc.).

Scheduling a reserved charging session for an EVSE (e.g., a single EVSE unit at a single location; etc.), can include updating a calendar for the EVSE with suitable reservation parameters, reserved charging session data (e.g., the scheduled time period for the reserved charging session; etc.), and/or other suitable data (e.g., user data; electric vehicle data; etc.). In specific example, each EVSE can be associated with their own calendar that can be used for facilitating reserved charging sessions and/or ad hoc charging sessions.

An EVSE reservation calendar is preferably cloud-based (e.g., available on-demand via Internet connectivity; etc.). In specific examples, the calendar can be updated (e.g., via one or more APIs) and/or otherwise modified by one or more applications (e.g., a plurality of applications through which reservation requests and/or modifications can be made; etc.). In specific examples, the calendar can account for historic, current, and future charging sessions. In variations, a set of EVSEs and/or a charging location (e.g., a charging location where a plurality of EVSEs reside; etc.) can share one or more calendars.

In a specific example, an EVSE can be associated with a single, cloud-based calendar for tracking ad hoc charging sessions and a set of reserved charging sessions (e.g., including any suitable reserved charging sessions for the EVSE; etc.). EVSEs can be operated in one or more disconnected modes (e.g., when there are connectivity issues between the EVSE and a corresponding cloud-based reservation calendar; etc.). A disconnected mode can be implemented based on one or more disconnected mode parameters associated with an EVSE. In an example, an EVSE is operable in a disconnected mode in response to a connectivity issue (e.g., in response to not being able to establish communication between a centralized reservation system and the EVSE; in response to lack of expected updates for the calendar from the associated EVSE; etc.) between the EVSE and the single, cloud-based calendar associated with the EVSE. In specific examples, operating the EVSE in the disconnected mode can include at least one of: allowing ad hoc charging sessions (e.g., in a mode only allowing for ad hoc charging sessions and not reserved charging sessions; etc.) and/or canceling the set of reserved charging sessions (e.g., cancelling currently reserved charging sessions for the EVSE; preventing future scheduling of reserved charging sessions, such as until connectivity with the EVSE is re-established; etc.); facilitating implementation of the set of reserved charging sessions (e.g., facilitating implementation of already-scheduled reserved charging sessions; such as when the EVSE has sufficiently local compute and memory to carry out such charging sessions; etc.) and/or preventing scheduling of future reserved charging sessions; shutting down the EVSE; and/or any other suitable actions.

However, calendars (e.g., EVSE-associated calendars; etc.) for facilitating charging sessions can be configured in any suitable manner.

Scheduling one or more reserved charging sessions is preferably performed after (e.g., in response to; at a time after; etc.) receiving one or more reservation requests, but can additionally or alternatively be performed automatically (e.g., independent of a reservation request; etc.), and/or at any suitable time relative portions of embodiments of the method 100, and/or at any suitable time.

However, scheduling one or more reserved charging sessions S120 can be performed in any suitable manner.

2.3 Determining a Check in.

Embodiments of the method 100 and/or 300 can include determining one or more check ins for one or more charging sessions S130 and/or S330, which can function to identify when a user, electric vehicle, and/or other entity has arrived for a given charging session.

Determining one or more check ins is preferably performed or one or more reserved charging sessions, but can additionally or alternatively be performed for any suitable type of charging sessions (e.g., ad hoc charging sessions; etc.).

A check in preferably indicates that an electric vehicle associated with a reserved charging session is ready to be charged (e.g., an EVSE is plugged into the electric vehicle; the electric vehicle is at the location of the EVSE, such as a selected EVSE and/or an EVSE associated with a determined charging location; etc.). Additionally or alternatively, a check in can indicate that a user has arrived at an EVSE and/or charging location corresponding to a reserved charging session, and/or can a indicate any other suitable information.

Determining a check in preferably includes determining one or more of a check in time (e.g., which can be compared to an early check in limit parameter if the check in time is prior to the corresponding reservation start time; which can be compared to a reservation grace period parameter if the check in time is after a corresponding reservation start time; etc.); user data (e.g., indicating the user who is checking in; etc.); electric vehicle data (e.g., indicating the electric vehicle to be charged during the reserved charging session; etc.); EVSE data (e.g., physical identifier and/or other suitable identifier of the EVSE that a user has checked in at, such as for when a plurality of EVSEs at one or more charging locations are eligible to be used by the user for a reserved charging session; etc.); and/or any other suitable data.

Determining one or more check ins can be based on one or more of: user input at a user device (e.g., user inputs, at a mobile application, indicating that the user has checked in and/or arrived at an EVSE and/or charging location associated with a reserved charging session; etc.); user location (e.g., based on location of a user device at and/or proximal an EVSE and/or charging location associated with a reserved charging session; etc.); user input at an EVSE; plugin of an EVSE into an electric vehicle; and/or any other suitable data indicative of a user check in for a charging session.

Determining one or more check ins is preferably performed by a reservation system (e.g., a centralized reservation system; a reservation system receiving check in indications from user devices, electric vehicles, EVSEs, and/or other suitable components; etc.), but can additionally or alternatively be performed by any suitable entities.

Determining a check in for a reserved charging session is preferably performed after scheduling the reserved charging session (e.g., where check ins are for reserved charging sessions that have been scheduled beforehand, etc.), but can additionally or alternatively be a performed at any suitable time relative portions of embodiments of the method 100, and/or at any suitable time.

However, determining a check in for a reserved charging session S130 and/or S330 can be performed in any suitable manner.

2.4 Causing Charging of an Electric Vehicle.

Embodiments of the method 100 can include causing charging of one or more electric vehicles for one or more reserved charging sessions S140, S340, and/or S350, which can function to provide charging in one or more reserved charging sessions.

Causing charging of one or more electric vehicles is preferably performed by causing one or more EVSEs to charge the one or more electric vehicles, but can additionally or alternatively be performed with any other suitable components.

Causing charging of one or more electric vehicles is preferably based on one or more integrations with one or more EVSEs. In examples, an integration (e.g., of the reservation system; etc.) with one or more EVSEs can allow remote communication (e.g., wireless communication; etc.) between the one or more EVSEs and another component (e.g., reservation system; etc.). In specific examples, integrations with one or more EVSEs can be based on one or more of: the Open Charge Point Protocol (OCPP) (e.g., for supporting communication between EVSEs and a central management system network; etc.), the Open Charge Point Interface protocol (OCPI) (e.g., for supporting connections between mobility service providers such as entities having electric vehicle drivers as customers, and Charge Point operators such as managers of EVSEs; etc.); and/or any other suitable protocols. In a specific example, an integration with one or more EVSEs can include an integration, via OCPI, with the network who can forward commands (e.g., control signals; etc.) to corresponding EVSEs.

Controlling (e.g., remotely controlling; etc.) one or more EVSEs can include issuing one or more of: start charging commands (e.g., a "remoteStart" API call through OCPI, where the API call can result in a control signal being forwarded by the network to one or more EVSEs; for the EVSE to begin charging of an electric vehicle; such as in response to determining a check in of a user for a reserved charging session associated with the EVSE; etc.); stop charging commands (e.g., a "remoteStop" API call through OCPI, where the API call can result in a control signal being forwarded by the network to one or more EVSEs; for the EVSE to stop charging of an electric vehicle; such as in response to a current time reaching a reservation end time; such as in response to a fully charged state of the electric vehicle; etc.); and/or any other suitable commands (e.g., for requesting data, such as charging session data for updating a calendar associated with the EVSE; etc.).

In a specific example, causing the EVSE to charge an electric vehicle (e.g., for an ad hoc charging session; etc.) based on an integration with the EVSE can include remotely issuing a first start charging command to the EVSE; and where causing the EVSE to charge an electric vehicle (e.g., a different electric vehicle; a same electric vehicle; etc.) (e.g., for a reserved charging session; etc.) based on an integration with the EVSE can include remotely issuing a second start charging command to the EVSE.

In variations, for a given reserved charging session, a plurality of EVSEs (e.g., a plurality of EVSEs in a single charging location; etc.) can service an electric vehicle associated with the reserved charging session. In a specific example, a user scheduled for a reserved charging session at a charging location including a plurality of EVSEs is not limited to use of a single EVSE of the plurality of EVSEs for the reserved charging session. In a specific example, a user can use any suitable available EVSE for a charging session at a charging location including a plurality of EVSEs. In a specific example, a charging location including a plurality of EVSEs can specify that a predetermined number of the plurality of EVSEs (e.g., a predetermined number that is less than the number of EVSEs in the plurality of EVSEs; etc.) are to be made available for reserved charging sessions (e.g., x number of EVSEs allotted to serving reserved charging sessions out of y number of total EVSEs for the charging location; etc.), and/or the remaining number of EVSEs are to be made available on a first come first served basis (e.g., y number of total EVSEs minus x number of EVSEs allotted to serving reserved charging sessions; etc.). In a specific example, the predetermined number of the plurality of EVSEs allotted for reserved charging sessions can correspond to any suitable EVSEs of the plurality of EVSEs (e.g., specific EVSEs are not specified; etc.), where a user can select any available EVSE of the plurality of EVSEs for a reserved charging session (e.g., such as long as the number of EVSEs serving reserved charging sessions is equal to the predetermined number, x, of EVSEs allotted to serving reserved charging sessions at the charging location; etc.). Alternatively, the predetermined number of the plurality of EVSEs allotted for reserved charging sessions can correspond to specified EVSEs (e.g., specified by a site host, a community management admin, etc.).

Causing an EVSE to charge an electric vehicle can be based on a physical identifier (and/or other suitable identifiers) for the EVSE. The physical identifier can be physically present at the EVSE (e.g., on the EVSE; etc.), can be unique to the EVSE, and/or can otherwise be configured. One or more physical identifiers can be mapped to one or more virtual identifiers (e.g., stored at a reservation system in association with the EVSE; etc.), but can additionally or alternatively associated with any suitable components. Causing an EVSE to charge an electric vehicle based on a physical identifier can include selecting the EVSE to remotely issue a command to based on the physical identifier of the EVSE. In a specific example, an EVSE can be from a set of EVSEs associated with a charging location (e.g., where a single charging location includes a plurality of EVSEs; etc.), where each EVSE from the set of EVSEs corresponds to a unique physical identifier, where remotely issuing a first start charging command includes remotely issuing the first start charging command to the EVSE based on the physical identifier for the EVSE. In the specific example and/or other suitable specific examples, remotely issuing a second start charging command can include remotely issuing the second start charging command to the EVSE based on the physical identifier for the EVSE.

In examples, a user can provide a physical identifier (e.g., for an EVSE selected by a user from a set of EVSEs associated with a single charging location; etc.). Users can provide physical identifiers through one or more of: a user device (e.g., through an application for the user device; etc.), an EVSE (e.g., through an EVSE interface; etc.), an electric vehicle, and/or any other suitable components. In a specific example, the method 100 can include prompting a user to provide the physical identifier for the EVSE selected by a user from the set of EVSEs (e.g., of a single charging location; etc.) for the reserved charging session; and/or receiving the physical identifier for the EVSE from the user. Additionally or alternatively, an EVSE physical identifier and/or other suitable EVSE identifiers can be automatically collected (e.g., based on a plug-in of the EVSE charger to the electric vehicle, etc.). EVSE identifiers and/or other suitable identifiers can be collected from EVSEs, electric vehicles (e.g., plugged-in with an EVSE; etc.), mobile devices (e.g., mobile phones, etc.), users, and/or any other suitable entities.

Causing an EVSE to charge an electric vehicle can be based on a power distribution type associated with one or more reservation parameters and/or other suitable parameters. There can be a user opt-in distribution type for power distribution associated with the solar production parameter, the infrastructure-limitation parameter, and the time-of-use parameter; a uniform power distribution type associated with the equally reduced power reduction parameter and the separately reduced power parameter; and a condition-based distribution type for distributing power associated with the condition-based parameter. A user opt-in power distribution type causes the EVSE to dynamically throttle the power output based on the associated reservation parameter (and/or other suitable reservation parameters that justifies throttling the EVSE to satisfy said reservation parameters). In specific examples, the reservation parameter can include one or more opt-in indications or opt-out indications for one or more power distribution types (e.g., a power reduction offered at a cheaper price. In examples, a uniform power distribution type causes the EVSE to throttle power equally among a set of EVSE (e.g., to keep total kW under a certain amount), or to deactivate individual EVSEs among a set of EVSE (e.g., deactivating a number of EVSE among a set of EVSE to keep total kW under a certain amount, etc.).

In examples, a condition-based power distribution type causes the EVSE to charge the electric vehicle based on the battery level associated with (e.g., needed for; required by; correlated with; etc.) a route or job (e.g., using telematics data, vehicle data, user data, and/or other suitable data and parameters, etc.). In a specific example, a condition-based distribution type can intelligently distribute power by determining the battery level needed based on the difference between current battery level and the needed battery level for the next job or route, and causing the EVSE to charge the electric vehicle for the needed battery level. A condition-based power distribution type can additionally or alternatively be used to plan for a road trip (via mobile applications, etc.), whereby optimal charging stops can be determined based on battery level needed for the subsequent charging stop (e.g., using telematics data such as including one or more of driver driving efficiency, total driving distance between charging stops, EVSE data indicating current availability, etc.).

In a specific example, user opt-in distribution types can be implemented for non-fleet users and/or scenarios, and condition-based power distribution types can be implemented for fleet users and/or scenarios.

However, power distribution types can be configured in any suitable manner.

In a specific example, causing the EVSE to charge an electric vehicle (e.g., for an ad hoc charging session; etc.) in accordance with a power distribution type based on an integration with the EVSE can include remotely issuing a start charging command to the EVSE; where causing the EVSE to charge an electric vehicle (e.g., a different electric vehicle; a same electric vehicle; etc.) (e.g., for a reserved charging session; etc.) based on an integration with the EVSE can include remotely issuing a continue charging command in accordance with a power distribution type for the charging session; and where causing the EVSE to continue charging based on an integration with the EVSE can include remotely issuing a throttle power output command for the EVSE in accordance with the power distribution type and/or access parameters.

In variations, electric vehicle location can be used in facilitating access and/or authentication. For example, if an electric vehicle arrives (e.g., tracked using vehicle location, etc.) proximal (e.g., at, etc.) an EVSE location within a threshold time period for a charging session (e.g., a reserved charging session where the electric vehicle is expected to arrive at the location and time; etc.), then access and/or authentication can be automatically granted (e.g., not requiring a morse code handshake, etc.). In a specific example, if more than one vehicle arrives in a threshold time window, a morse code authentication process can be used to differentiate the vehicles (e.g., where a short code, such as a 2-digit code, could be used).

In variations, group codes can be generated for a fleet, community, and/or other set of vehicles, where such a code can be shared across the set of vehicles. A group code can be refreshed (e.g., on a periodic interval, such as daily, etc.). Communities can be associated with and/or include one or more of workplaces, multi-unit dwellings, school campuses, hospitality, and/or other suitable community settings. In specific examples, group codes can be 3-digits in length and/or any suitable length (e.g., shorter lengths; longer lengths to accommodate scenarios where a larger number of vehicles are expected to be at an EVSE site at the same time, where the longer group code can be used to differentiate, etc.). In specific examples, group codes can be associated with different access parameters (e.g., a pricing parameter, a dedicated time slot parameter, etc.) to allow for group and/or time-specific pricing.

However, morse codes and associated authentication approaches can be configured in any suitable manner.

Causing charging of one or more electric vehicles is preferably performed by a reservation system (e.g., a centralized reservation system in remote communication with a set of EVSEs for issuing one or more commands; etc.), but can additionally or alternatively be performed by any suitable components.

Causing charging of one or more electric vehicles is preferably performed after (e.g., in response to; etc.) determining a check in of a user for a reserved charging session (e.g., where an EVSE associated with the reserved charging session is caused to charge an electric vehicle for a user associated with the reserved charging session; etc.), but can additionally or alternatively be performed at any suitable time relative portions of embodiments of the method 100, and/or at any suitable time.

Causing charging of one or more electric vehicles can be based on (e.g., dependent upon, etc.) determining payment (e.g., for the charging session; etc.) and/or authentication. Determining payment and/or authentication can be performed by one or more of: a charger management system, a reservation system, an application of a user device, an EVSE, and/or any other suitable components.

However, causing charging of one or more electric vehicles S140, S340, and/or S350 can be performed in any suitable manner.

2.5 Facilitating an Ad Hoc Charging Session.

Embodiments of the method 100 can additionally or alternatively include facilitating one or more ad hoc charging sessions S150, which can function to guide and/or implement one or more ad hoc charging sessions. Additionally or alternatively, embodiments of the method 100 can prevent one or more ad hoc charging sessions (e.g., in response to determination of ineligibility of a user for an ad hoc charging session; etc.).

An ad hoc charging session preferably includes a charging session that was not reserved ahead of time, such as a charging session that is being requested for a current time at an EVSE and/or charging location, such as at an EVSE and/or charging location that is proximal (e.g., nearby; at; etc.) a user location (e.g., determined based on a user device location; etc.).

Facilitating one or more ad hoc charging sessions can additionally or alternatively include determining eligibility for an ad hoc charging session (e.g., for an electric vehicle at an EVSE; etc.) S152; accounting for an ad hoc charging session S154; causing an EVSE to charge the electric vehicle for the ad hoc charging session S156; and/or any other suitable processes for facilitating one or more ad hoc charging sessions S150.

Determining eligibility for an ad hoc charging session S152 can function to determine whether to allow an ad hoc charging session for a user. Determining eligibility for an ad hoc charging session is preferably based on one or more reservation parameters (e.g., from a reservation request; etc.) and/or one or more EVSE reservation parameters.

In examples, determining eligibility for an ad hoc charging session can be based on a comparison between an ad hoc time period (e.g., a current time period; a time associated with request of an ad hoc charging session by a user; etc.) and a scheduled time period. In a specific example, determining eligibility for the ad hoc charging session based on the comparison between the ad hoc time period and the scheduled time period can include: determining a length of time difference between the ad hoc time period and the scheduled period (e.g., where the length of time difference can include the amount of time from a current time until the reservation start time for the next scheduled reserved charging session; etc.); and/or in response to the length of time difference exceeding a first length of time difference threshold (e.g., a predetermined threshold, such as 30 minutes, 45 minutes, 60 minutes, etc.; an automatically determined threshold, such as based on the schedule of reserved charging sessions and/or other suitable variables; etc.), determining that a user (e.g., associated with the second electric vehicle, etc.) and/or other suitable entity is eligible for the ad hoc charging session. In a specific example, determining eligibility for the ad hoc charging session based on the comparison between the ad hoc time period and the scheduled time period can include: in response to the length of time difference exceeding a second length of time difference threshold (e.g., when the time until the upcoming reserved charging session is sufficiently large, such as greater than the maximum session duration for the EVSE; such as greater than an ad hoc time period corresponding to a predicted ad hoc charging session duration indicated by a user input describing an end time and/or desired charging session duration for the ad hoc charging session; etc.), determining that a user (e.g., associated with second electric vehicle; etc.) and/or other suitable entity is eligible for the ad hoc charging session for a duration specified by a maximum session duration parameter associated with the EVSE. Determining eligibility for an ad hoc charging session can include collecting one or more user inputs (e.g., in response to prompting the user for a user input, such as at a mobile application and/or at a vehicle application; etc.) describing an end time and/or desired charging session duration for the ad hoc charging session, such as where an ad hoc time period can be based on the one or more user inputs (e.g., desired ad hoc charging session duration and/or end time; etc.). Determining eligibility can include processing an ad hoc charging session as a reserved charging session associated with a reservation start time parameter of the current time (e.g., now).

However, determining eligibility for an ad hoc charging session S152 can be performed in any suitable manner.

Accounting for an ad hoc charging session S154 can function to track, record, and/or otherwise account for the ad hoc charging session, such as to prevent scheduling of reserved charging sessions that would overlap with the ad hoc charging session and/or a threshold time period after the ad hoc charging session. Accounting for one or more ad hoc charging sessions can include one or more of: updating EVSE calendars (e.g., for EVSEs used in the one or more ad hoc charging sessions; etc.); recording ad hoc charging session data; and/or any other suitable processes.

However, accounting for an ad hoc charging session S154 can be performed in any suitable manner.

Causing an EVSE to charge one or more electric vehicles for one or more ad hoc charging sessions S156 can function to implement the ad hoc charging session with the EVSE.

Causing an EVSE to charge one or more electric vehicles for one or more ad hoc charging sessions is preferably performed after (e.g., in response to; etc.) receiving a request for an ad hoc charging session (e.g., from a user at a user device; from a user via an EVSE interface; etc.), but can additionally or alternatively be performed at any suitable time relative portions of embodiments of the method 100, and/or at any suitable time.

Causing an EVSE to charge one or more electric vehicles for one or more ad hoc charging sessions S154 can be performed in any suitable manner analogous to and/or similar to causing an EVSE to charge one or more electric vehicles for one or more reserved charging sessions S140. However, causing an EVSE to charge one or more electric vehicles for one or more ad hoc charging sessions S156 can be performed in any suitable manner.

Any suitable portions of facilitating one or more ad hoc charging session with an EVSE can be performed at any suitable time period relative facilitating one or more reserved charging sessions with the EVSE. In a specific example, an EVSE can be used in implementing a first ad hoc charging session, followed by a first reserved charging session, followed by a second ad hoc charging session, followed by a second reserved charging session, etc. Additionally or alternatively, any suitable number of ad hoc charging sessions and/or reserved charging sessions can be implemented with an EVSE in any suitable order at any suitable time (e.g., any suitable mixture of ad hoc charging session(s) and reserved charging session(s), etc.). However, facilitating one or more ad hoc charging sessions can be performed at any suitable time relative portions of embodiments of the method 100, and/or at any suitable time.

Any suitable number of ad hoc charging sessions can be facilitated. In a specific example, an EVSE can be used in implementing a plurality of ad hoc charging sessions and a plurality of reserved charging sessions for a given time period (e.g., for a given day; etc.). In a specific example, a first EVSE can be used in implementing an ad hoc charging session concurrently with a second EVSE used in implementing a reserved charging session. However, any suitable number of EVSEs can implement any suitable number of ad hoc charging sessions and/or reserved charging sessions concurrently, sequentially, and/or at any suitable time in any suitable order.

However, facilitating one or more ad hoc charging sessions S150 can be performed in any suitable manner.

2.6 Providing a User Interface.

Embodiments of the method 100 and/or 300 can additionally or alternatively include providing a user interface S160, which can function to provide users with means to communicate with a reservation system and/or other suitable components, such as for submitting, viewing, tracking, modifying, and/or otherwise using reservation requests, check ins, payment, authentication, and/or other suitable processes.

Providing a user interface preferably includes providing a user interface via a mobile application for a mobile user device, but one or more user devices can additionally or alternatively be provided through any suitable applications and/or for any suitable devices.

Providing a user interface can include providing a means for viewing EVSEs and/or charging locations on a map (e.g., where reservation requests can be submitted for such EVSEs and/or charging locations; where information can be provided to the user regarding the EVSEs and/or charging locations; etc.).

In a specific example, the method 100 can include providing a user interface at a mobile application for a user device, where the user interface includes a set of charging location indicators (e.g., graphical indicators on a graphical map; any suitable indicators; etc.) associated with a set of EVSEs including the EVSE, where the reservation request is associated with a charging location indicator of the set of charging location indicators, where the charging location indicator is associated with the EVSE.

In a specific example (e.g., in relation to an ad hoc charging session; etc.), the method 100 can include providing a user interface at a mobile application for user device of a user associated with an electric vehicle, where the user interface includes: a start charging button associated with the ad hoc charging session, where the start charging button is configured to graphically indicate the eligibility for the ad hoc charging session (e.g., based on determining eligibility for the ad hoc charging session S152; etc.); and/or a reservation button for submitting a reservation request for a reserved charging session.

In a specific example, the method 300 can include providing a user interface at a mobile application for a user device, where the user interface can include one or more of a map of the route, a set of charging location indicators associated with a set of EVSEs that have been determined to provide optimum charging (e.g. based on the battery level needed, the distance traveled, driver driving efficiency, and/or other telematics data, etc.), and/or a reservation button for submitting a user reservation request for a reserved charging session, wherein the reservation button can be configured to graphically indicate optimum charging locations based on the battery level needed for the route.

However, providing one or more user interfaces S16o can be performed in any suitable manner.

2.7 Providing a Notification.

Embodiments of the method 100 and/or 300 can additionally or alternatively include providing one or more notifications S170, which can function to inform and/or guide one or more users (e.g., drivers of electric vehicles, owners of electric vehicles, and/or otherwise associated with electric vehicles; etc.), hosts (e.g., managers of EVSEs and/or charging stations; etc.), and/or any other suitable entities.

Providing notifications preferably includes providing mobile device notifications (e.g., alerts, banners, notification center notifications, lock screen notifications; etc.), but providing notifications can additionally or alternatively include providing notifications to any suitable device and/or entity through any suitable means.

Notifications can include notifications for any suitable portions of embodiments of the method 100, such as notifications for any suitable portions of a charging session (e.g., reserved charging session; ad hoc charging session; etc.). Notifications can include notifications to users and/or hosts for one or more of: reservation scheduling (e.g., notifications for successful reserving a of a reserved charging session; etc.); reservation cancellation (e.g., notifications for reservation cancellation by a host; notifications for reservation cancellation by a user; etc.); reservation approaching (e.g., notifications prior to reservation start time, where different notifications can be provided based on the amount of time until the reservation start time; notifications that can be skipped if a user has checked in for a reserved charging session; etc.); reservation start (e.g., notifications at reservation start time, where such notifications can be skipped if the user has checked in for the reserved charging session; notifications indicating that the reserved charging session will be canceled after a threshold amount of time if the user has not checked in; notifications upon check in by the user for a reserved charging session; notifications upon determining a connected EVSE to the electric vehicle and/or starting of charging, where such notifications can indicate the amount of charging to occur in the charging session; etc.); early check in (e.g., notifications to a host for indicating electric vehicle data, billing data, user data, and/or other suitable information, such as if the EVSE is available for use; notifications if the EVSE is currently unavailable and in use; etc.); charging stopped (e.g., notifications in response to a driver unplugging the EVSE earlier than the reservation end time; notifications indicating that the electric vehicle is fully charge; notifications in response to driver termination of a reserved charging session before reservation end time; etc.); reservation ending (e.g., notifications indicating an upcoming reservation end time during a reserved charging session; notifications indicating overstay penalty for staying past the reservation end time; where such notifications can be skipped if the EVSE is unplugged from the electric vehicle; etc.); reservation completed (e.g., notifications indicating completion of a reserved charging session; etc.); overstay (e.g., notifications based on the overstay penalty associated with the EVSE; notifications indicating that the user has overstayed past the reservation end time, such as notifications provided during an overstay and the EVSE is still connected to the electric vehicle; notifications encouraging the user to move their electric vehicle; etc.); overstay and upcoming reserved charging session (e.g., notifications for when a first user has overstayed past their reservation end time, and when a different reserved charging session is upcoming or being blocked by the first user; notifications encouraging the overstaying user to move their electric vehicle; notifications provided at regular time intervals; etc.); vendor coupons (e.g., notifications for coupons offered by one or more vendors; notifications to users who charged their electric vehicle or used an associated application on their user device near any EVSEs within a suitable threshold distance from a vendor offering a coupon; etc.); new charger available (e.g., notifications to users describing the new EVSE and/or associated information; etc.); events (e.g., notifications for special events such as power outages; co-marketing activities; etc.)

Notifications can include textual content (e.g., text-based communications; any suitable font size, font color, font type; other font parameters; spacing parameters; etc.); graphical content (e.g., communications including images, video, etc.); audio parameters (e.g., audio-based communications such as through music, sound notifications, a human voice; any suitable volume parameters; tone parameters; pitch parameters; etc.); touch content; and/or any other suitable type of content. Notification content can differ based on the type and/or format of the notification. In a specific example, textual content can differ between notifications for different stages and/or aspects of a charging session. In a specific example, textual content can differ between alerts and banners for the same stage and/or aspects of a charging session.

Providing notifications can be performed by a reservation system and/or by any other suitable components. Providing notifications can be performed at any suitable items relative portions of embodiments of the method 100, and/or at any suitable time and at any suitable frequency.

However, providing notifications S170 can be performed in any suitable manner.

3. Other

Embodiments of the method 100, 300 and/or system 200 can include every combination and permutation of the various system components and the various method processes, including any variants (e.g., embodiments, variations, examples, specific examples, figures, etc.), where portions of embodiments of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

Portions of embodiments of the method 100, 300 and/or system 200 can be embodied and/or implemented at least in part as a machine configured to receive a computer-readable medium storing computer-readable instructions. The instructions can be executed by computer-executable components that can be integrated with embodiments of the system 200. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to embodiments of the method 100, 300, system 200, and/or variants without departing from the scope defined in the claims. Variants described herein not meant to be restrictive. Certain features included in the drawings may be exaggerated in size, and other features may be omitted for clarity and should not be restrictive. The figures are not necessarily to scale. The absolute or relative dimensions or proportions may vary. Section titles herein are used for organizational convenience and are not meant to be restrictive. The description of any variant is not necessarily limited to any section of this specification.

What is claimed is:

1. A method for charging a first electric vehicle at a first Electric Vehicle Service Equipment (EVSE), the method comprising:
   receiving a reservation request from a first user at a first user device for a first charging session, wherein the first user is associated with the first electric vehicle, and wherein the reservation request comprises at least one reservation parameter indicative of the first charging session for the first electric vehicle;
   determining eligibility for a power distribution type for the first charging session at the first EVSE;
   determining a first check in at the first EVSE for the first charging session;
   after determining the first check in at the first EVSE for the first charging session, causing the first EVSE to charge the first electric vehicle in accordance with the power distribution type for the first charging session, based on an integration with the first EVSE.

2. The method of claim 1, wherein causing the first EVSE to charge the first electric vehicle in accordance with the power distribution type comprises causing the first EVSE to charge the first electric vehicle with reduced power based on a set of power distribution parameters comprising at least one of:
  a solar production parameter associated with solar production, an infrastructure-limitation parameter associated with infrastructure limitations, a time-of-use parameter associated with periods of high activity and low activity, an equally reduced power parameter associated with throttling the power output equally for a set of EVSEs, a separately reduced power parameter associated with throttling the first EVSE separately from the set of EVSEs, and a condition-based parameter associated with a battery level associated with a route.

3. The method of claim 2, wherein the power distribution type comprises at least one of:
  a user opt-in distribution type for power distribution associated with the solar production parameter, the infrastructure-limitation parameter, and the time-of-use parameter; a uniform distribution type associated with the equally reduced power parameter and the separately reduced power parameter; and
  a condition-based distribution type for distributing power associated with the condition-based parameter.

4. The method of claim 2, causing the first EVSE to charge the first electric vehicle with reduced power in accordance with the power distribution type comprises causing the first EVSE to charge the first electric vehicle with reduced power based on the condition-based parameter, wherein the method further comprises determining the battery level associated with the route based on a difference between a current battery level and a battery level needed in total to complete the route, and based on telematics data comprising at least one of: a total distance including a return route as required for charging, a weather report, a terrain condition, a load weight, and a driver driving efficiency; wherein the driver driving efficiency is determined by the battery level in real-time and the total distance traveled.

5. The method of claim 2, further comprising: providing a user interface at a mobile application, wherein the user interface comprises: a map of the route, and a reservation button for submitting a user reservation request for a reserved charging session, wherein the reservation button is configured to graphically indicate optimum charging locations based on the battery level associated with the route.

6. The method of claim 1, wherein determining the first check in comprises:
  generating a code by a charger management system, wherein the code comprises a data sequence uniquely identifying the first electric vehicle; and
  causing the first electric vehicle to communicate the code to the first EVSE, and wherein the check in is successful upon receiving, by the first EVSE, the code.

7. The method of claim 6, wherein the code comprises a Morse code, wherein causing the first electric vehicle to communicate the code comprises allowing and disallowing a first electric vehicle charger in sequence, wherein allowing and disallowing the first electric vehicle charger occurs periodically and for a duration corresponding to communication of the Morse code.

8. The method of claim 1, wherein determining the check in at the first EVSE comprises matching a charging location associated with the first EVSE with the vehicle location corresponding to the first electric vehicle.

9. The method of claim 1, wherein causing the first EVSE to charge the first electric vehicle based on the first integration with the EVSE comprises: remotely issuing a start charging command to the EVSE; and issuing a continue charging command to the first EVSE, and a reduce power output command for the first EVSE based on the power distribution type.

10. The method of claim 1, wherein the power distribution type is a condition-based power distribution type determined from a battery level needed for a fleet job.

11. The method of claim 10, wherein causing the first EVSE to charge the first electric vehicle according to the power distribution type comprises determining the battery level needed for the fleet job based upon route of travel, vehicle data, and telematics data.

12. The method of claim 1, wherein the first user comprises one of a fleet group member and a fleet management entity.

13. The method of claim 1, wherein determining eligibility for the power distribution type further comprises associating the first user with a dynamic access parameter for a fleet access group, and allowing the first user to charge the first electric vehicle based upon the dynamic access parameter.

14. The method of claim 13, wherein allowing the first user to charge the first electric vehicle comprises allowing charging with pricing specified for the fleet access group.

15. The method of claim 1, further comprising restricting access to the first EVSE by a second vehicle during business hours of a fleet group, wherein the second vehicle is unassociated with a fleet access group.

16. The method of claim 1 wherein, the power distribution type is associated with reduced power from the first EVSE for the first charging session, and wherein the first charging session is associated with a demand response event.

17. A method for charging a first electric vehicle at a first Electric Vehicle Service Equipment (EVSE), the method comprising:
  receiving a reservation request from a first user at a first user device for a first charging session, wherein the first user is associated with the first electric vehicle, and wherein the reservation request comprises at least one reservation parameter indicative of the first charging session for the first electric vehicle;
  determining eligibility for a power distribution type, wherein the power distribution type is a condition-based power distribution type, for the first charging session at the first EVSE;
  determining a first check in at the first EVSE for the first charging session, wherein determining the first check in at the first EVSE for the first charging session comprises issuing, via a charger management system, a code for authentication between the first electric vehicle and the first EVSE and receiving a communication of the code to the first EVSE during the first check in;
  after determining the first check in at the first EVSE for the first charging session, causing the first EVSE to charge the first electric vehicle in accordance with the power distribution type for the first charging session, based on an integration with the first EVSE.

18. The method of claim 17, wherein the code is an access code associated with a fleet group.

19. The method of claim 17, wherein the power distribution type is determined from a battery level needed for a fleet job.

20. The method of claim 17, wherein the code is a binary code.

\* \* \* \* \*